Jan. 6, 1953   J. D. MOULTON   2,624,767
PRIMARY BATTERY
Filed Nov. 22, 1946
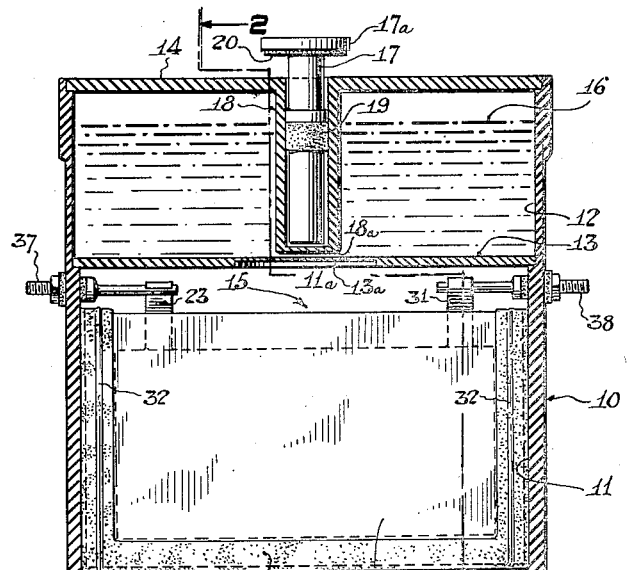
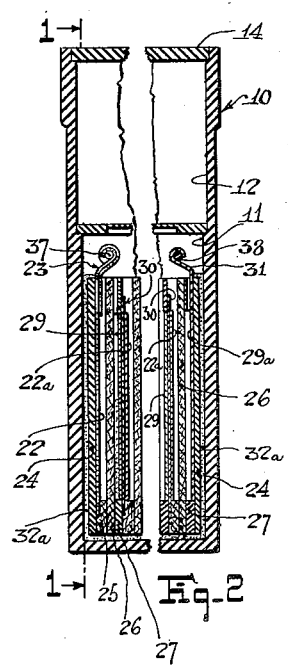
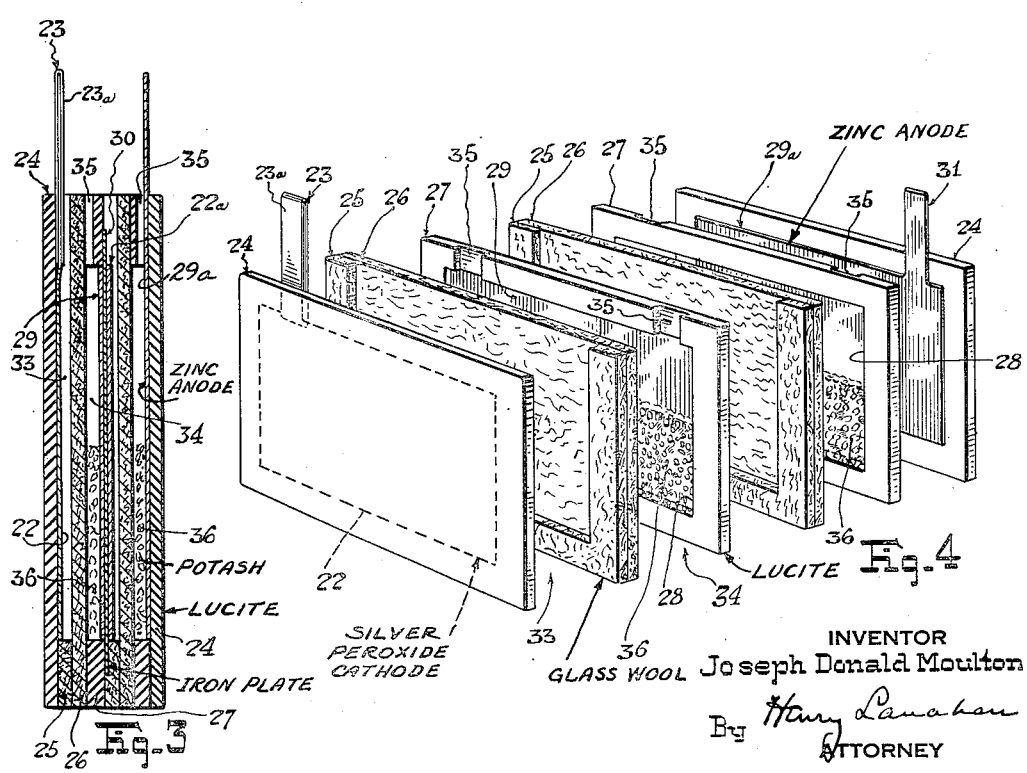
INVENTOR
Joseph Donald Moulton
By Harry Lanahan
ATTORNEY Patented Jan. 6, 1953

2,624,767

UNITED STATES PATENT OFFICE 2,624,767

PRIMARY BATTERY

Joseph Donald Moulton, West Orange, N. J., assignor to Thomas A. Edison, Incorporated, West Orange, N. J., a corporation of New Jersey Application November 22, 1946, Serial No. 711,672

7 Claims. (Cl. 136—113)

My invention relates to a novel and improved primary battery—the term "battery" being herein employed to mean one or more cells—and is concerned particularly, although not limitatively, with zinc-anode alkaline-electrolyte primary batteries of the deferred-action type.

It is an object of my invention to provide a primary battery which will operate efficiently at cold temperatures.

It is another object to provide a complete primary cell of the deferred-action type which is adapted to withstand cold temperatures while in both its unactivated and activated conditions.

It is another object of my invention to provide a primary battery which has a high volume and weight efficiency.

It is another object to provide a novel manner of assembling primary cells whereby a number of the cells may be grouped into a small space.

It is another object to provide a novel battery of a deferred-action type in which all the cells are adapted for activation by a common body of liquid.

It is another object to provide a novel form of primary cell of the deferred-action type which is adapted to become activated quickly upon the same being supplied with an electrolyte solvent.

It is another object to provide a novel primary battery wherein adjacent cells are electrically connected in series by the partition wall between them.

Another object is to provide a novel activating liquid for primary cells of the deferred-action type.

These and other objects and features of my invention will be apparent from the following description and the appended claims.

In the description of my invention reference is had to the accompanying drawings, in which:

Figure 1 is a vertical section, taken substantially on the line 1—1 of Figure 2, showing a primary battery in which my invention is incorporated;

Figure 2 is a vertical section taken substantially on the line 2—2 of Figure 1;

Figure 3 is a fractional sectional view, to enlarged scale, of a twin-cell assembly constructed according to my invention; and Figure 4 is an exploded perspective view of the cell assembly shown in Figure 3.

In the figures there is shown a primary battery of the deferred-action type, which has a case 10 provided with lower and upper compartments 11 and 12 separated by a partition wall 13. At the top there is a cover plate 14 which is sealed liquid-tight to the case. The case and cover may suitably be molded of plastic such as Lucite, (methyl methacrylate) or any suitable material not attacked by strong alkali. When Lucite is used the cover may be sealed in place by means of Lucite cement.

The compartment 11 is a sealed chamber for housing one or more primary cells generally referred to as 15. The cells are of a deferred-action type which are activated by being supplied with a liquid electrolyte solvent 16 contained in the compartment 12 while the battery is in its unactivated condition. The release of the solvent 16 into the cell chamber to activate the battery is effected manually by means of a plunger 17 that is mounted slidably in a well 18 depending from the cover plate into the compartment 12 to approximately the partition wall 13. The bottom wall 18a of the well and a section 13a of the partition wall 13 are of a thin frangible character so that they may be readily ruptured upon the plunger being pressed downwardly. The plunger may be provided with a sealing ring 19 which slidably engages the interior surface of the well 18 and, additionally, with an annular seal 20 on the under side of the head 17a thereof so that when the plunger is pressed downwardly, as until the head abuts against the top side of the cover plate, the compartment 12 will be sealed liquid-tight to prevent any possible leakage of the solvent 16.

Preferably, I provide a number of cells in the compartment 11 as indicated in Figure 2. For purposes of simplfying the description of my invention, however, the details of construction of the individual cells and the manner of assembling them in a series stacked arrangement are illustrated by the twin-cell group shown in Figures 3 and 4. The lefthand cell of this twin-cell group comprises a cathode (positive) plate 22 provided with an upstanding terminal 23. This cathode plate is backed by a relatively strong insulating plate 24, such as of Lucite, which constitutes one end wall of the cell group. Lying against the side and bottom rim portions of the plate 24, at the edge of the cathode plate 22, is a U-shaped spacer 25 which has preferably a texture like that of a mat, the spacer being made suitably of glass-wool fibers. Positioned next against the spacer 25 is an insulating sheet 26 of a wick-type material which also may be suitably in the form of a mat made of glass wool fibers. Lying next adjacent to the sheet 26 is a rectangular frame 27 made of insulating plastic such as Lucite. This frame has a central opening 28 extending therethrough. Within this opening at the right side of the frame there is an anode (negative) plate 29. Lying against the right side of this anode plate is a conductor plate 30, made preferably of iron, which is sealed to the right side of the frame 27 as by Lucite cement.

The conductor plate 30 constitutes the end wall of an individual cell and the partition wall between adjacent cells of the cell assembly; additionally, this conductor plate provides an internal series connection between adjacent cells as will herein next appear.

Mounted on the right side of the conductor plate 30 and in electrical contact therewith is a cathode plate of the righthand cell of the twin-cell group. This cathode plate, referred to as 22a, is the same as the plate 22 aforementioned except that it does not have the terminal 23. Positioned to the right of the frame 27 aforementioned, in the order here named, are the U-shaped spacer 25, insulating sheet 26 and frame 27. At the right side of this latter frame 27 there is a second anode plate, referred to as 29a, which is like the anode plate 29 aforementioned except that it is provided with a terminal lug 31. This anode plate is backed by a second insulating plate 24 which forms the right end wall of the cell assembly.

The cell assembly is bound by wire straps 32 and is then sealed liquid-tight at its bottom and side edges by a sealing compound 32a comprising for example a mixture of carnauba and other suitable waxes. Also by this sealing compound the cell assembly is sealed into the bottom compartment 11 as illustrated in Figure 1. The terminals 23 and 31 of the cell assembly are connected respectively to positive and negative terminal posts 37 and 38 which are mounted insulatedly on the side walls of the case.

It will be understood that only one or a large number of cells may be employed. However, by my invention I may use a large number of cells in a small space since the cells may be stacked very compactly. For example, five cells may be placed in a stack only ⅞" long. If only a single cell were employed it would be understood that the anode plate 29 would be provided with a terminal such as has the plate 29a.

Each individual cell has a liquid-tight chamber which is partitioned by the insulating sheet 26 into a lefthand compartment 33 and a righthand compartment 34 within the frame 27. The latter compartment has two vent passageways 35 provided by slotting the frame 27 at the top. This compartment 34 serves suitably as a container for a dry soluble electrolyte 36 for the cell, the compartment being initially about half filled with this electrolyte as shown.

Preferably I employ in each cell an anode plate made of zinc, a caustic alkali electrolyte such as of potash, and a cathode plate the active material of which is silver peroxide. This cathode plate is preferably constructed as described and claimed in the pending application Serial No. 634,822, filed December 13, 1945, now Patent No. 2,561,943, and having a common assignee with the present application; this manner of constructing the plate is briefly as follows: a copper screen the size of the desired plate and of suitable thickness, for example .016", is first nickel-plated and then pressed to about half its original thickness. A paste of silver oxide and water is then applied to this screen, as by a brush or spatula, and next the silver oxide is reduced to silver by a sintering operation. The resultant plate is then again compressed to get a smooth surface. Next, the plate is placed in an electrolytic bath of caustic alkali, say of 5% to 25% strength, using nickel-plated steel as an electrode, and current is passed through the bath for several hours after which the plate is removed from the bath and is air-dried. In this resultant plate the original copper screen has in intimate contact therewith a layer of silver peroxide.

The terminal 23 and the portion of the plate 22 adjacent to the terminal have an increased thickness so as to have a decreased electrical resistance. This increased thickness is obtained, for example, by clamping a U-shaped piece of metal 23a onto the terminal and suitably securing it thereto as indicated in Figure 3.

When a caustic alkali electrolyte is used, the activating solvent 16 is water. Preferably I use substantially pure water to which is added a substantially electrically non-conductive anti-freeze so that the solvent may withstand very cold temperatures, say 40° F. below zero, without freezing. Antifreezes particularly suitable for the present purposes are of the class comprising water-soluble alcohol such as methyl or ethyl alcohol, ethylene glycol, glycerine, etc. Preferably, I use alcohol typically in the ratio to water of 20% by volume. Particularly desirable properties of the ethyl and methyl alcohols are that they themselves are effective solvents for the caustic alkali electrolyte and will with the water solvent cause the generation of a considerable amount of heat when the alkali is dissolved.

When the wall section 13a is ruptured the water and alcohol flow downwardly into the compartment 33 and through the passageways 35 into the compartment 34 of each cell. Since the passageways 35 are relatively small the liquid solvent 16 does not tend to wash any of the dry electrolyte out of the compartment 34 when the solvent is released from the compartment 12. Likewise that portion of the solvent 16 which enters the compartment 33 is prevented by the sheet 26 from washing any of the dry electrolyte out of the compartment 34 even though the solvent is initially in a turbulent state. The sheet 26 acting as a wick does however conduct the liquid solvent from the compartment 33 into the compartment 34. This conduction occurs gradually yet very rapidly because the sheet has a large surface area exposed to the activating liquid and is relatively thin. As a result, the electrolyte is dissolved very quickly to cause the cell to be activated almost the instant the plunger 17 is depressed. This activation occurs immediately even though the cell is used in very cold temperatures because of the large amount of heat of solution which is generated as the electrolyte is dissolved. Moreover, the cell is maintained at a sufficiently high temperature to assure its efficient operation once the cell is activated because of the continuing heat which is generated during the use of the cell and the fact that the cell is substantially thermally insulated from the outside ambient by the case 10, particularly when the case is made of Lucite.

A feature of my invention is that all of the serially-connected cells are activated by a common body of electrolyte solvent. Preferably a quantity of solvent is provided which is sufficient to rise to a level above the cell chambers in the space 11a so as to assure that each cell will be filled. Although the excess supply of electrolyte solvent in the space 11a is common to all cells, it does not produce any substantial shorting of the cells within the normal life period of the battery. This is because the dissolved electrolyte is confined substantially within the individual cells and the electrolyte above the cells, being substantially pure water and alcohol, is not electrically conductive.

The foregoing detailed description of my invention is intended to be illustrative and not necessarily limitative of my invention as the same is subject to changes and modifications without departure from the scope of my invention, which I endeavor to express according to the following claims.

I claim:
1. An electric battery comprising a case, a plurality of cells in the bottom portion of said case each having spaced anode and cathode plates and respective chambers between said plates open to the space in the case above the cells, a sheet of wick material parallel with said plates and dividing each of said chambers into compartments, a dry caustic alkali in only one of the compartments of each cell, an openable chamber in the upper portion of said case, and an electrolyte solvent in said openable chamber.

2. A deferred-action primary battery comprising a case, a plurality of cells in said case electrically connected in series and having individual chambers for electrolyte, each of said chambers having an opening at the top communicating with a common space in said case above the cell group, a substantially dry caustic alkaline electrolyte in each of said cells, a compartment in the upper part of said case adapted to be opened to communicate with said common space, and a substantially electrically non-conductive electrolyte solvent in said chamber containing an antifreeze, each of the said openings leading from said cells being restricted to prevent washout of electrolyte from the cell by turbulence of the solvent as the solvent is released from said compartment.

3. An electric battery comprising a plurality of cells electrically connected in series and respectively having electrolyte compartments provided with inlet passageways at the top of the cells, a caustic alkaline electrolyte in said compartments, and a common body of liquid electrolyte solvent filling a space above said cells and communicating with said compartments through said passageways, said solvent comprising substantially pure water and an electrically non-conductive antifreeze whereby to prevent short-circuiting of said cells.

4. A primary cell comprising a pair of spaced anode and cathode plates sealed along their bottom and side edges to form a liquid-tight chamber therebetween, a porous sheet of wick-like material interposed between said plates to divide said chamber into two compartments, one of said compartments being wholly open at the top along the length of said porous sheet to permit ingress of an electrolyte-activating liquid when the cell is to be put into use, means closing the other of said compartments at the top along at least the major portion of the length of said porous sheet, and a soluble electrolyte material in said other compartment.

5. A primary cell comprising a pair of spaced anode and cathode plates, a sheet of a wick-type material spaced from and positioned between said plates, and a dry electrolyte material in the space between said sheet and one of said plates.

6. A primary cell comprising a frame having a central opening extending therethrough, an electrode plate of one polarity mounted on said frame at one side thereof and closing one end of said opening, a sheet of a wick-type material at the other side of said frame and closing the other end of said opening to form a chamber within the frame, a passageway leading from said chamber through the top portion of said frame, a second electrode plate of another polarity spaced from the side of said sheet opposite said frame, and means sealing said second plate to said frame at their bottom and side edges.

7. An electric battery comprising a case, a plurality of cells in a portion of said case having respective chambers open to the space in the case outside the cells, a sheet of wick material dividing each of said chambers into compartments, one of the compartments of each cell being partially closed from said space, a dry caustic alkali in said one compartment of each cell, a compartment in the upper portion of said case openable to said space, and an electrically non-conductive electrolyte solvent in said openable compartment.

JOSEPH DONALD MOULTON.

REFERENCES CITED

The following references are of record in the file of this patent:

UNITED STATES PATENTS

| Number | Name | Date |
| --- | --- | --- |
| 270,884 | Berliner | Jan. 23, 1883 |
| 1,390,524 | French et al. | Sept. 13, 1921 |
| 1,509,209 | Huntley | Sept. 23, 1924 |

FOREIGN PATENTS

| Number | Country | Date |
| --- | --- | --- |
| 22,281 | Great Britain | of 1911 |
| 211,571 | Great Britain | Feb. 22, 1924 |

OTHER REFERENCES

Handbook of Chemistry and Physics, Chemical Rubber Publishing Co., Cleveland, Ohio, 26th edition, 1942, p. 1713.